United States Patent
Huang (10) Patent No.: US 7,267,445 B2
(45) Date of Patent: Sep. 11, 2007

(54) COMBINER, OPTICAL COMBINER MODULE AND DIGITAL LIGHT PROJECTION SYSTEM USING THE SAME

(75) Inventor: Junejei Huang, Taoyuan Hsien (TW)

(73) Assignee: DELTA Electronics, Inc., Taoyuan (TW)

( * ) Notice: Subject to any disclaimer, the term of this patent is extended or adjusted under 35 U.S.C. 154(b) by 312 days.

(21) Appl. No.: 10/905,558

(22) Filed: Jan. 11, 2005

(65) Prior Publication Data
US 2005/0168708 A1 Aug. 4, 2005

(30) Foreign Application Priority Data
Jan. 29, 2004 (TW) .............................. 93101928 A (51) Int. Cl.
*G03B 21/14* (2006.01)
(52) U.S. Cl. ..................... 353/81; 353/33; 359/834
(58) Field of Classification Search ................. 353/33, 353/81; 359/629, 633, 634, 640, 831–837
See application file for complete search history.

(56) References Cited

U.S. PATENT DOCUMENTS

| 3,560,082 | A | * | 2/1971 | Burch et al. ................. 359/638 |
| 6,141,150 | A | * | 10/2000 | Ushiyama et al. ........... 359/618 |
| 6,407,868 | B1 | * | 6/2002 | Ishibashi et al. ............. 359/634 |
| 6,760,168 | B2 | * | 7/2004 | Lee .............................. 359/834 |
| 7,031,062 | B2 | * | 4/2006 | Kao ............................ 359/618 |
| 2002/0005998 | A1 | * | 1/2002 | Nagata et al. ............... 359/831 |
| 2005/0141097 | A1 | * | 6/2005 | Ho ............................... 359/640 |

* cited by examiner

*Primary Examiner*—William C. Dowling
(74) *Attorney, Agent, or Firm*—Jianq Chyun IP Office (57) ABSTRACT

A projection system includes a light source, a beam splitter module, a projection lens, and an optical combiner module includes at least one light valve for forming the image. A light beam emitted from the light source is split by the beam splitter module into three color lights and such three color lights are thereafter combined by the optical combiner module. The optical combiner module comprises a combiner and a plurality of prisms disposed adjacent to the combiner. The combiner comprises at least a pared-corner, and one side of at least one prism is leant adjacent to the pared-corner of the combiner so as to minimize the size of the optical combiner module and shorten the back focal length between the light valve and the projection lens. In addition, the projection quality of the digital light projection system is not easy to be influenced by heat temperature.

20 Claims, 7 Drawing Sheets

COMBINER, OPTICAL COMBINER MODULE AND DIGITAL LIGHT PROJECTION SYSTEM USING THE SAME

CROSS-REFERENCE TO RELATED APPLICATION

This application claims the priority benefit of Taiwan application serial no. 93101928, filed Jan. 29, 2004.

BACKGROUND OF THE INVENTION

1. Field of the Invention

The present invention generally relates to a combiner and a miniaturized optical combiner module. More particularly, the present invention relates to a combiner and an optical combiner module having small size and a digital light projection system using the optical combiner module to shorten back focal length.

2. Description of Related Art

Conventionally, the key component of the digital light processing (DLP) projector is a semiconductor component controlled by two-bits pulse tuning, wherein the semiconductor component is generally called a digital micro-mirror device (DMD). The DMD may control a digital optical switch very rapidly and may control the light source very precisely. The image displaying method of DLP projector is different from the conventional liquid crystal projector (LCP). In the conventional LCP, the image is displayed by the transmitted light via a liquid crystal panel. However, in the DLP projector, the image is displayed by reflecting the light from the micro mirrors on the digital micro-mirror device (DMD). Therefore, the weight of the DLP projector can be reduced down to less than 2.5 kg, however, the weight of a conventional projector is generally up to 8 to 15 kg. In addition, the size of the DLP projector is less than that of the conventional projector. Moreover, the optical efficiency and resolution of the DLP projector are much better than that of the conventional projector. Since the digital micro-mirror device (DMD) has high reflectivity and high fill factor, the optical efficiency of the digital micro-mirror device (DMD) is high. Therefore, the DLP projector is very suitable for the application requiring high brightness and high resolution. Moreover, the DLP projector may provides fully digitized color display, and precise and stable image display.

Figure 1:
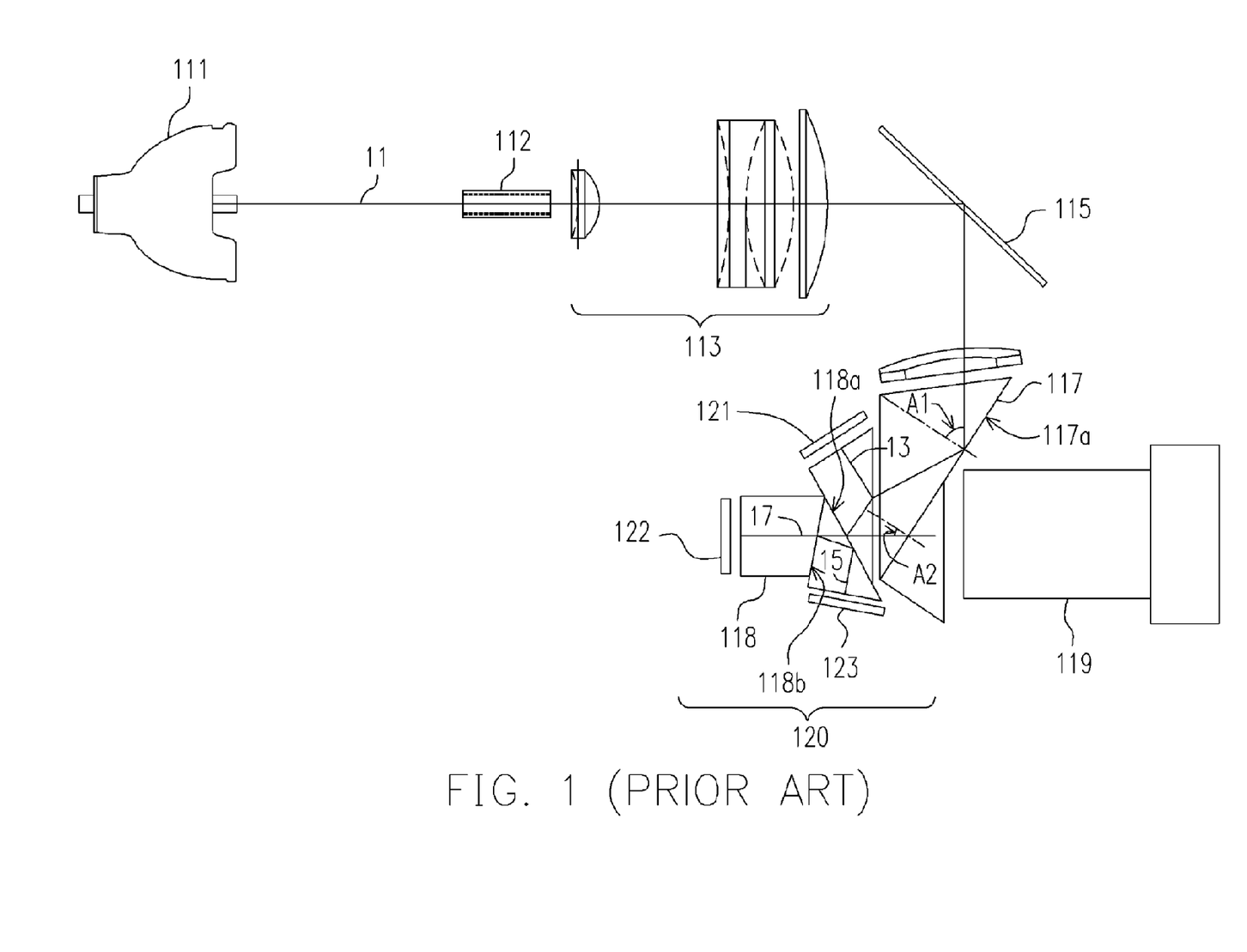
FIG. 1 is a plan diagram schematically illustrating the internal of a conventional digital processing projection device.

FIG. 1 is a plan diagram schematically illustrating the internal structure of a conventional digital processing projection device. Referring to FIG. 1, a conventional DLP projector is generally constructed by a light source 111, a rod integrator 112, an aspheric lens set 113, a reflection mirror 115, a beam splitter module 120 and a projection lens. The light 11 emitted by the light source 111 is propagated through the rod integrator 112 and aspheric lens set 113 and condensed in the reflection mirror 115.

Referring to FIG. 1, a conventional beam splitter and optical combiner module 120 includes a total internal reflection (TIR) prism 117 and a Philips prism 121. The light 11 described above is reflected by the reflection mirror 115 to the total reflection plane 117a of the total internal reflection (TIR) prism 117. It is noted that the incident angle A1 of the light 11 incident on the total reflection plane 117a is larger than the critical angle of total reflection. In addition, there is an air gap between prisms 31 and 32 of the total internal reflection (TIR) prism 117. Therefore, the light 11 is propagated from optically denser medium to optically less denser medium, and thus the light 11 is totally reflected on the total reflection plane 117a and is incident to the Philips prism 121.

There are two layers of coating in the Philips prism. For the coating 118a, the red light 13 of the light 11 is reflected, and the remainder color lights are transmitted. For the coating 118b, the blue light 15 of the remained color lights transmitted from the coating 118a is reflected, and thus the remainder green light 17 is transmitted. Accordingly, after the light 11 propagated through the Philips prism 121, the light 11 is split into the red light 13, the green light 17 and the blue light 15. Each of the three color lights are incident to digital micro-mirror devices (DMD) 121, 122 and 123 by a specific angle respectively.

The red light 13, green light 17 and blue light 15 incident on the digital micro-mirror devices (DMD) 121, 122 and 123 are reflected respectively, and the reflected red light 13, green light 17 and blue light 15 represent the red image, green image and blue image respectively. Thereafter, the red light 13, green light 17 and blue light 15 reflected by the digital micro-mirror devices (DMD) 121, 122 and 123 are incident on the total reflection plane 117a. In the meanwhile, the incident angle A2 of the red light 13, green light 17 and blue light 15 incident on the total reflection plane 117a is less than the critical angle of the total reflection of that. Therefore, the red light 13, the green light 17 and the blue light 15 are transmitted through the total reflection plane 117a of the total internal reflection (TIR) prism 117. Therefore, the red light 13, green light 17 and blue light 15 are projected via the projection lens 119.

In a conventional DLP projector, before the light is incident on the Philips prism, it is not split into the red light, the green light and the blue light. The color splitting of the light is performed by the Philips prism. The Philips prism at least has the disadvantages of heavy weight and large size. The Philips prism is the heaviest component of the whole DLP projector. In addition, the back focal length of the Philips prism is long. Furthermore, since the color splitting and combining of the light are all performed in the Philips prism, the thermal problem is usually generated and the projection quality is adversely influenced.

SUMMARY OF THE INVENTION

Accordingly, the present invention is directed to a combiner including at least a paired corner. The combiner has the advantages of light weight, small size, short back focal length, and without aforementioned thermal problem.

Accordingly, the present invention is directed to an optical combiner module having the advantages of light weight, small size, short back focal length, and without aforementioned thermal problem.

In addition, the present invention is also related to a digital light projection system having the advantages of light weight, small size, short back focal length. Moreover, the projection quality is not easily influenced by temperature.

According to one embodiment of the invention, a combiner comprising at least paired corner is provided.

According to another embodiment of the invention, an optical combiner module comprising, for example but not limited to, a combiner and a plurality of prisms disposed adjacent to the combiner is provided. The combiner comprises at least a pared-corner, and one side of at least one prism is leaned against the pared-corner of the combiner to minimize the size of the optical combiner module.

According to still another embodiment of the invention, an optical combiner module disposed in an intersection of a plurality of color lights split by a beam splitter module is provided. The optical combiner module may comprise a combiner, a plurality of prisms and a plurality of light valves. The combiner may comprise at least a pared-corner. The prisms may be disposed adjacent to the combiner, wherein one side of one of the prisms is leaned adjacent to the pared-corner of the combiner. The light valves may be adopted for forming the image, respectively disposed in a path of the color lights after the prisms, wherein the color lights are reflected to the light valves by a total reflection plane of each of the prisms respectively and said color lights reflected by the light valves are transmitted through the prisms and thereafter are combined by the combiner.

In one embodiment of the invention, the combiner comprises, for example but not limited to, X-prism or other optical component may be provided as optical combiner. The combiner comprises four sides, a top surface, a bottom surface and three lean surfaces. The top surface and bottom surface are adjacent to the sides respectively. A portion of the lean surfaces is adjacent to the top surface and one side of the combiner, and another portion of lean surfaces is adjacent to the bottom surface and one side of the combiner. Furthermore, the shape of the lean surface is, for example but not limited to, regular triangle.

In one embodiment of the invention, the prisms comprise, for example but not limited to, three total internal reflection (TIR) prisms, wherein each TIR prism comprises a first prism and a second prism. The first prism comprises a first light incident plane, a first junction surface and a first light exit plane, and the second prism comprises a second junction surface and a second light exit plane. There is an air gap between the second junction surface and a portion of the first junction surface, and another portion of the first junction surface is disposed adjacent to one of the lean surfaces, and the second light exit plane is disposed adjacent to one side of the combiner. Furthermore, the first light incident plane of each of the TIR prisms is disposed in a first plane, and the top surface of the combiner is disposed in a second plane, and an angle between the first plane and the second plane is about 45°.

In one embodiment of the invention, the TIR prisms comprise, for example but not limited to, a red light TIR prism, a green light TIR prism and a blue light TIR prism. The red light TIR prism and the blue light TIR prism are disposed on opposite side of the combiner. Furthermore, the red light TIR prism further comprises, for example but not limited to, a blue light reflecting coating to filter out stray light. Moreover, the blue light TIR prism further comprises, for example but not limited to, a red light reflecting coating to filter out stray light.

In one embodiment of the invention, in each TIR prism, the second light exit plane of the second prism comprises, for example but not limited to, a transparent region and a light shielding region, and the light shielding region is provides for filtering out the light at OFF state.

According to another embodiment of the invention, a digital light projection system is provided. The digital light projection system comprises, for example but not limited to, a light source, a beam splitter module, an optical combiner module as described above, a combiner and a projection lens. First of all, a light emitted by the light source is propagated into a beam splitter module via a rod integrator. The light is split into a plurality of color lights by the beam splitter module. The optical combiner module is disposed in an intersection of the color lights after the beam splitter module. The projection lens is disposed in the path of the color lights after the optical combiner module.

In one embodiment of the invention, the color lights comprise, for example but not limited to, a first color light, a second color light and a third color light. The beam splitter module comprises, for example but not limited to, a first two-way beam splitter mirror and a second two-way beam splitter mirror. The first two-way beam splitter mirror is disposed in the path of light after the light source and the rod integrator for reflecting the first color light and transmitting the second color light and the third color light. The second two-way beam splitter mirror is disposed in the path of the second color light and third color light after the first two-way beam splitter mirror for reflecting the second color light and transmitting the third color light.

In one embodiment of the invention, the beam splitter module further comprises, for example but not limited to, a first condenser lens and a second condenser lens. The first condenser lens is disposed in the path of the light between the light source and the first two-way beam splitter mirror, and the second condenser lens is disposed in the path of the first color light, second color light and third color light between the first two-way beam splitter mirror and the TIR prism. A relay processing may be performed to each color light for compensating the difference between the paths of each color lights before each color lights are incident on the combiner 200. Therefore, a correct image may be obtained.

In one embodiment of the invention, the beam splitter module further comprises, for example but not limited to, at least a reflection mirror disposed in the path of light between the first two-way beam splitter mirror and the combiner.

Accordingly, in the digital light projection system of the present invention, the light is split into red, green and blue lights by the beam splitter component before incident on the total internal reflection (TIR) prism. Therefore, the light incident on each TIR prism can be combined by X-prism.

In addition, the combination of the X-prism and the TIR prism of the present invention have the advantages of light weight, small size, inexpensive, and shorter back focal length compared to Philips prism. Therefore the total weight of the digital light projection system can be reduced drastically, and the projection quality is also improved.

Furthermore, the TIR prism of the present invention has less thermal problem in comparison with the Philips prism. Thus, the influence of temperature on projection quality is minimized.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The following drawings illustrate embodiments of the invention and, together with the description, serve to explain the principles of the invention.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
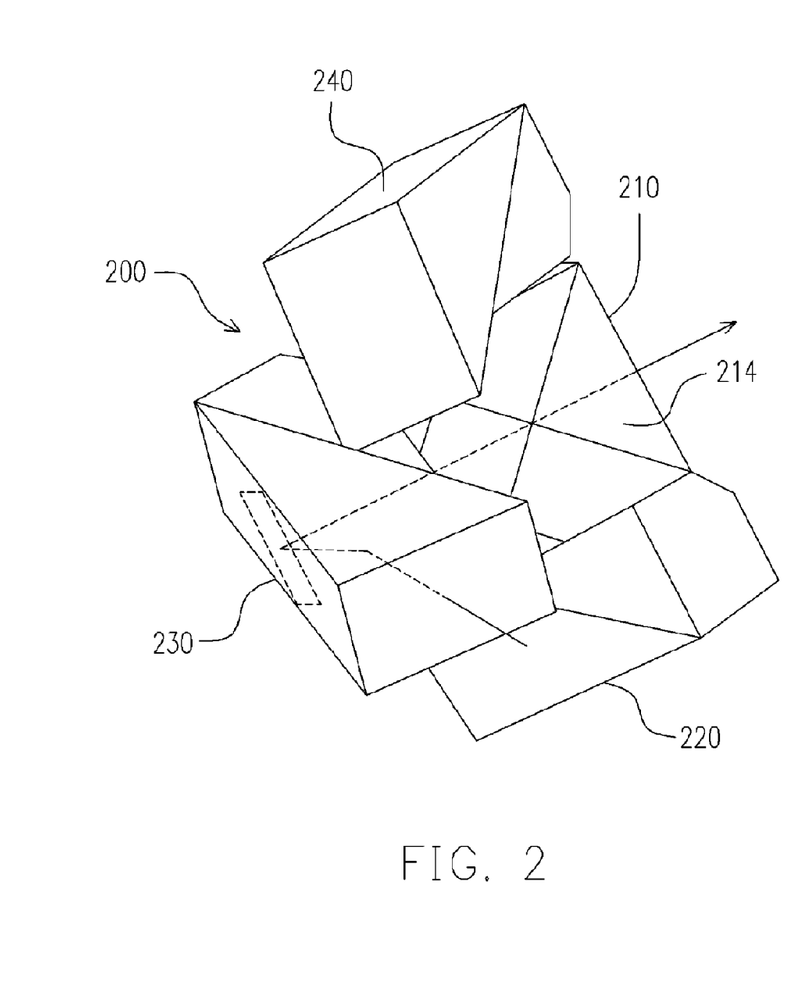
FIG. 2 is a three-dimensional diagram schematically illustrating an optical combiner module according to an embodiment of the present invention.
Figure 3:
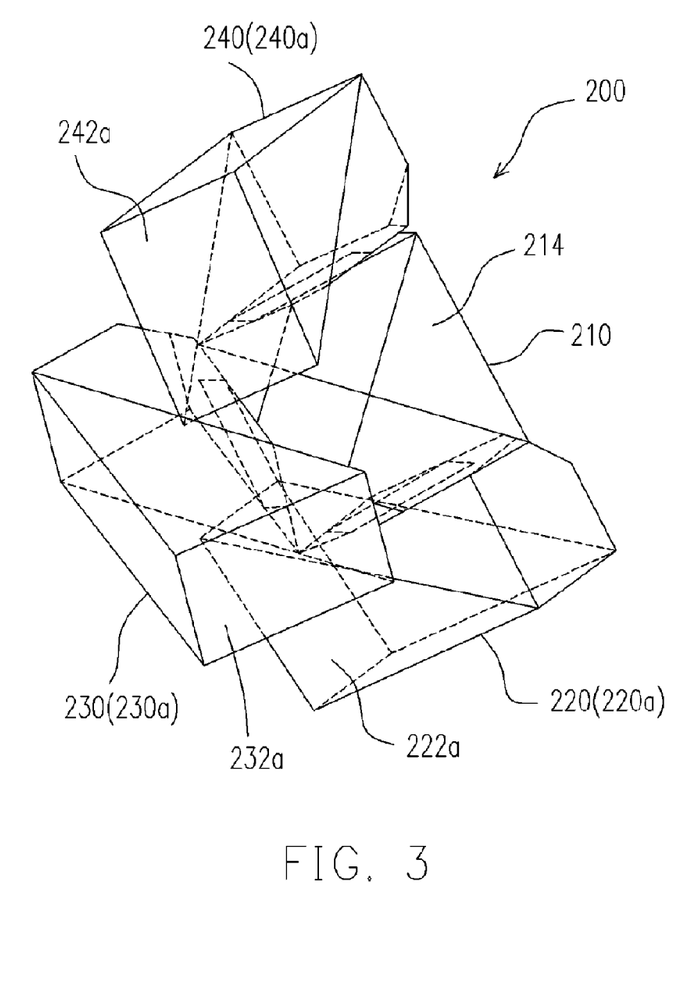
FIG. 3 is a perspective diagram schematically illustrating an optical combiner module of FIG. 2.

FIG. 2 is a three-dimensional diagram schematically illustrating an optical combiner module according to an embodiment of the present invention, and FIG. 3 is a perspective diagram schematically illustrating an optical combiner module of FIG. 2. Referring to FIG. 2 and FIG. 3, in one embodiment of the present invention, the optical combiner module 200 includes, for example but not limited to, a combiner 210 and a plurality of prisms 220, 230 and 240 disposed adjacent to the combiner 210. In the embodiment, three prisms 220, 230 and 240 are provided, however, the number of prisms is not limited to three.

Figure 4A:
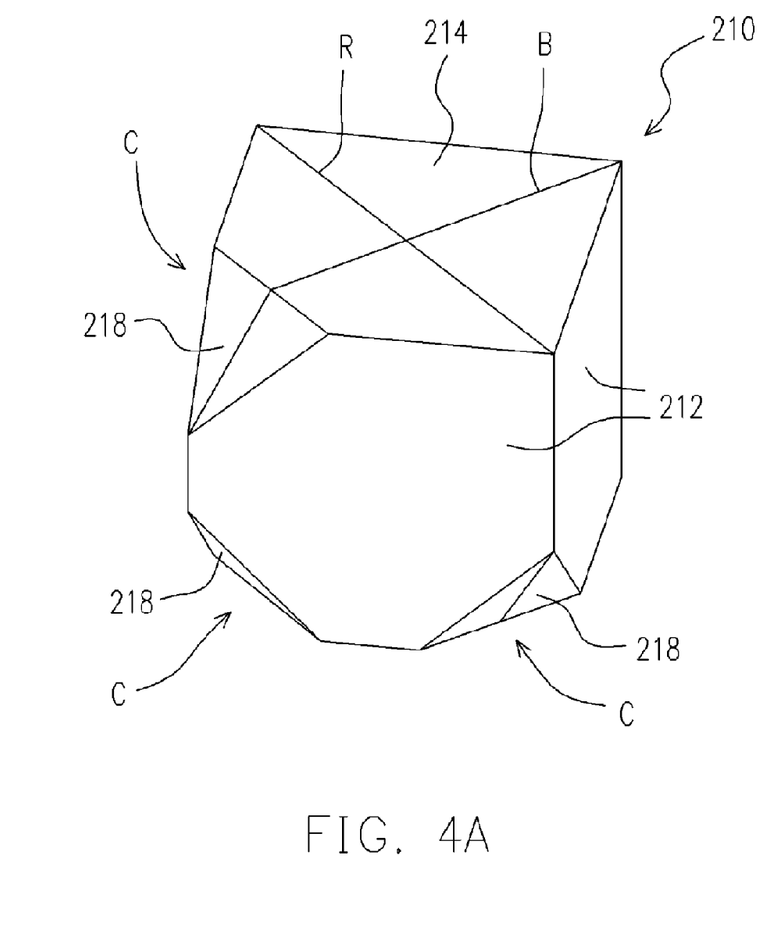
FIG. 4A is a three-dimensional diagram schematically illustrating the combiner of FIG. 2.
Figure 4B:
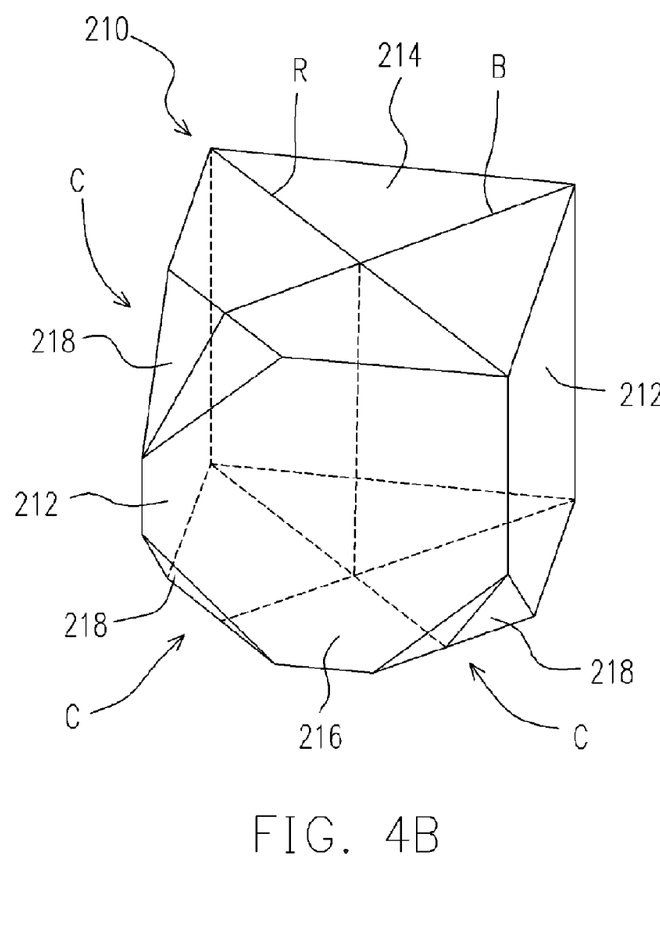
FIG. 4B is a perspective diagram schematically illustrating the combiner of FIG. 2.

FIG. 4A and FIG. 4B are a three-dimensional diagram and a perspective diagram illustrating the combiner shown in FIG. 2 respectively. Referring to FIG. 4A and FIG. 4B, in one embodiment of the present invention, the combiner 210 has, for example but not limited to, at least a pared-corner C. In the embodiment, although three pared-corners C are provided, however, the amount of the pared-corner C of the invention are not limited and is decided according to the requirement.

Referring to FIG. 4A and FIG. 4B, the combiner 210 of one embodiment of the present invention includes, for example but not limited to, an X-prism or other optical combiner. In an embodiment of the present invention, for example but not limited to, there are two optical coatings R and B in the internal of the X-prism. The optical coating R is an optical coating for reflecting red light, and the optical coating B is an optical coating for reflecting blue light. Furthermore, the above-described X-prism is substantially a regular hexahedron having four sides 212, a top surface 214, a bottom surface 216 and three lean surfaces 218. The top surface 214 and the bottom surface 216 are adjacent to sides 212 respectively. A portion of the lean surface 218 is adjacent to the top surface 214 and one of the sides 212, and another portion of the lean surface 218 is adjacent to the bottom surface 216 and one another side 212. Furthermore, the shape of the lean surface 218 is, for example but not limited to, a regular triangle.

Referring to FIG. 2, FIG. 3, FIG. 4A and FIG. 4B, at least one side of the prism 220, 230 and 240 is leaned against the pared-corner C of the combiner 210. Therefore, the size of the optical combiner module 200 is effectively reduced.

Figure 5A:
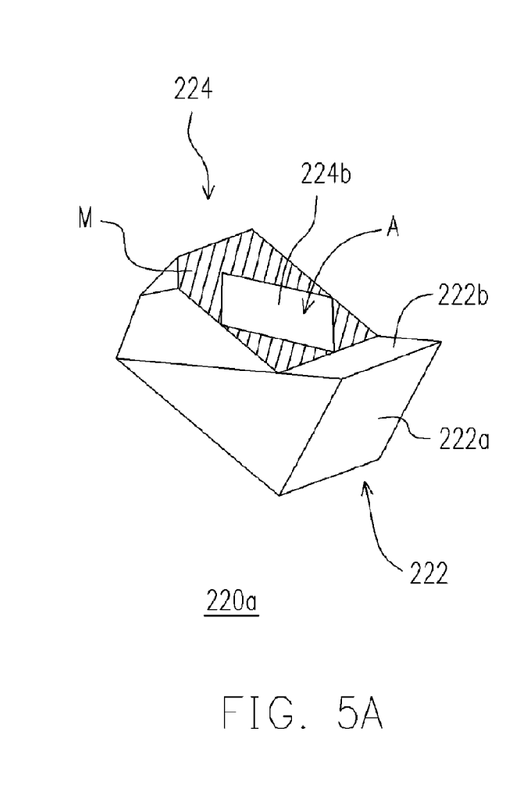
FIG. 5A is a three-dimensional diagram schematically illustrating the total internal reflection (TIR) prism of FIG. 2.
Figure 5B:
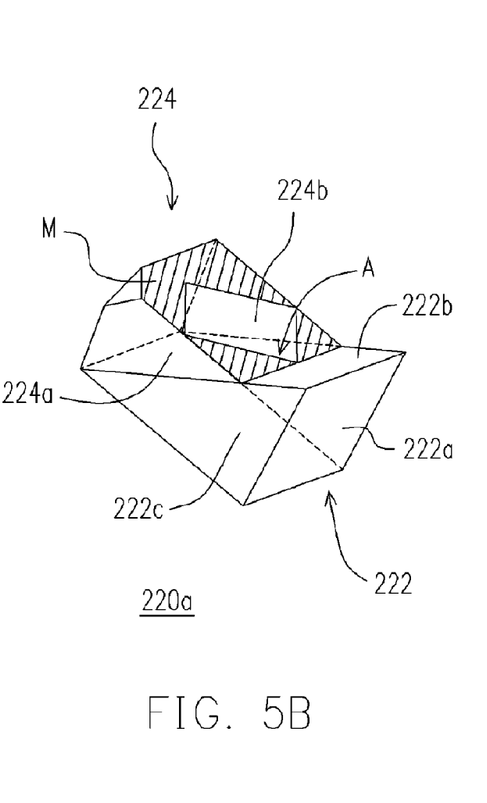
FIG. 5B is a perspective diagram schematically illustrating the total internal reflection (TIR) prism of FIG. 2.
Figure 5C:
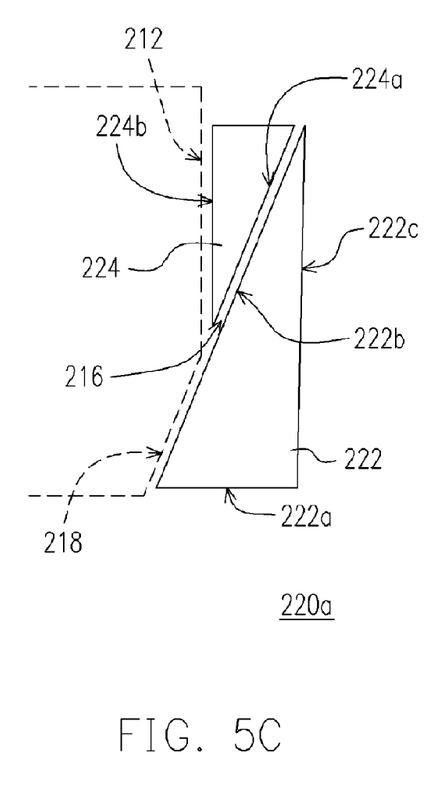
FIG. 5C is a lateral view schematically illustrating the total internal reflection (TIR) prism of FIG. 2.

FIG. 5A, FIG. 5B and FIG. 5C are a three-dimensional diagram, a perspective diagram and a lateral view schematically illustrating the total internal reflection (TIR) prism of FIG. 2 respectively. Referring to FIG. 5A, FIG. 5B and FIG. 5C, in one embodiment of the present embodiment, the prisms 220, 230 and 240 comprises, for example but not limited to, total internal reflection (TIR) prism 220a, 230a and 240a. Hereinafter, an embodiment using the total internal reflection (TIR) prism 220a will be described in detail.

Referring to FIG. 5A and FIG. 5B, the total internal reflection (TIR) prism 220a comprises, for example but not limited to, a first prism 222 and a second prism 224. The first prism 222 comprises, for example, a first light incident plane 222a, a first junction surface 222b and a first light exit plane 222c. The second prism 224 comprises, for example, a second junction surface 224a and a second light exit plane 224b. In addition, in the total internal reflection (TIR) prism 220a, the second light exit plane 224b of the second prism 224 comprises, for example but not limited to, a transparent region A and a light shielding region M. The light shielding region M is provided for filtering out the stray light.

Thereafter, referring to FIG. 5C, in the total internal reflection (TIR) prism 220a, there is an air gap 216 between the second junction surface 224a and a portion of the first junction surface 222b. Another portion of the first junction surface 222b is disposed adjacent to an lean surface 218. The second light exit plane 224b is disposed adjacent to one of the sides 212.

Referring to FIG. 3 and FIG. 5C, in one embodiment of the invention, the total internal reflection (TIR) prism 220, 230 and 240 comprises, for example but not limited to, a red light TIR prism 220a, a green light TIR prism 230a and a blue light TIR prism 240a respectively. The red light TIR prism 220a and the blue light TIR prism 240a are disposed, for example, on the opposite side of the combiner 210. In addition, each first light incident plane 222a, 232a and 242a of TIR prisms 220a, 230a and 240a is disposed on a first plane (not shown) respectively. The top surface 214 of the combiner 210 is disposed on a second plane (not shown), and an angle between the first plane and the second plane is, for example but not limited to, 45°.

Accordingly, the red light TIR prism 220a further comprises, for example but not limited to, a blue light reflecting coating disposed on the first junction surface 222b of the first prism 222, or on the second junction surface 224a of the second prism 224 to filter out the stray light except for the blue light. In addition, the blue light TIR prism 240a further comprises, for example but not limited to, a red light reflecting coating to filter out the stray light except for the red light.

Figure 6:
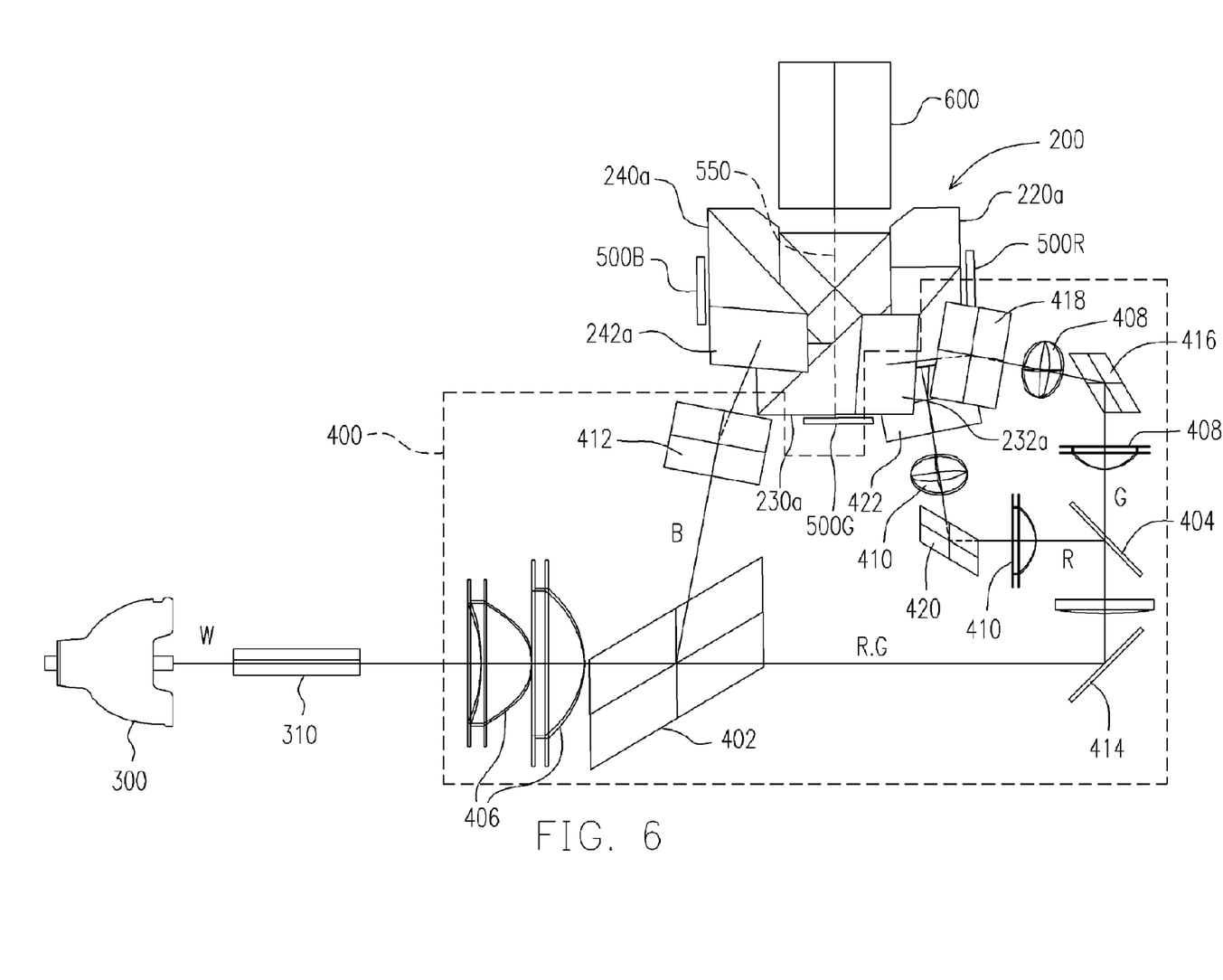
FIG. 6 is a top view schematically illustrating a digital light projection system according to an embodiment of the present invention.

FIG. 6 is a top view schematically illustrating a digital light projection system according to an embodiment of the present invention. Referring to FIG. 6, in one embodiment of the present invention, the digital light projection system comprises the above-described optical combiner module 200, a light source 300, a beam splitter module 400, a plurality of digital micro-mirror devices (DMD) 500R, 500G and 500B, and a projection lens 600. Hereinafter, each component of the digital light projection system will be described in detail.

First of all, a light W is emitted from the light source 300. The light source 300 comprises, for example but not limited to, metal-halide lamp (MHL) or ultra-high performance (UHL) lamp that may provide a high brightness, high color saturation white light.

The beam splitter module 400 is disposed in the path of the light W after the light source 300, and is provided for separating the light W into a first color light, a second color light and a third color light, such as three primary color lights R, G and B. In one embodiment of the invention, the beam splitter module 400 comprises, for example but not limited to, a first two-way beam splitter mirror 402 and a second two-way beam splitter mirror 404. The first two-way beam splitter mirror is disposed in the path of the light W after the light source 300 for reflecting the color light B and transmitting the color light R and color light G. The second two-way beam splitter mirror 404 is disposed in the light path of the color light R and the color light G after the first two-way beam splitter mirror 402 for reflecting the color light R and transmitting the color light G.

The optical combiner module 200 is disposed in the intersection of color lights R, G and B after the beam splitter module 400. The size of the optical combiner module 200 is effectively reduced. The back focal length is referred to the vertical distance between the digital micro-mirror devices (DMD) 500R, 500G and 500B and the projection lens 600. Therefore, the back focal length 550 of the projection device of the present invention is also effectively reduced.

In order to enhance the projection quality of the digital light projection system of the present invention, the beam splitter module 400 may comprise, for example but not limited to, a first condenser lens 406 and/or second condenser lenses 408 and 410. The first condenser lens 406 is disposed in the path of the light W between the light source 300 and the first two-way beam splitter mirror 402. The second condenser lenses 408 and 410 are disposed in the light path of the color lights R and G between the first two-way beam splitter mirror 402 and the combiner 200. It is noted that, the second condenser lenses 408 and 410 disposed in the path of the color lights R and G are provided for correct incidence of the image on the combiner 200. In one embodiment of the invention, a relay processing is performed to the color lights R and G before being incident on the combiner 200. In addition, in one embodiment of the invention, the digital light projection system further comprises a rod integrator 310 disposed in the path of the light W between the light source 300 and the first two-way beam splitter mirror 402.

In order to reduce the size of the digital light projection system, in one embodiment of the invention, it is optional to dispose reflection mirrors 412, 414, 416, 418, 420 and 422. The reflection mirror 412 is disposed in, for example but not limited to, the light path of the color light B between the first two-way beam splitter mirror 402 and the combiner 200. The reflection mirror 414 is disposed in, for example but not limited to, the path of the color lights R and G between the first two-way beam splitter mirror 402 and the second two-way beam splitter mirror 404. The reflection mirrors 416 and 418 are disposed in, for example but not limited to, the path of the color light G between the second two-way beam splitter mirror 404 and the combiner 200. The reflection mirrors 420 and 422 are disposed in, for example but not limited to, the path of the color light R between the second two-way beam splitter mirror 404 and the combiner 200.

The digital micro-mirror devices (DMD) 500R, 500G and 500B are disposed in the path of the color lights R, G and B after the optical combiner module 200 respectively. It is noted that, each color light R, G and B is reflected to the DMDs 500R, 500G and 500B by the air gap of the TIR prisms 220a, 230a and 240a respectively, and then reflected by the DMDs 500R, 500G and 500B and transmitted the TIR prisms 220a, 230a and 240a. In addition, the projection lens 600 is disposed in the light path of each color light R, G and B of the optical combiner module 200.

As shown in FIG. 6, the path of each color light R, G and B in the beam splitter module 400 is specially designed, and will be described in detail hereinafter. A path of color light B and a path of color light R and G are generated after the light W passes the first two-way beam splitter mirror 402. In addition, a path of color light R and a path of color light G are generated after the color light R and G passes the second two-way beam splitter mirror 404. Hereinafter, the disposing of the reflection mirrors in the paths of color light B, color light R and color light G will be described respectively.

In the path of color light B, the reflection surface of the first two-way beam splitter mirror 402 is disposed, for example but not limited to, a little upward to reflect the color light B upward. The reflection surface of the reflection mirror 412 is disposed, for example but not limited to, a little downward between the first two-way beam splitter mirror 402 and the combiner 200 to reflect the color light B to the second light incident plane 242a. In other words, the position of the reflection mirror 412 is a little higher than the first two-way beam splitter mirror 402 and the combiner 200.

In the path of color light G, the reflection surface of the reflection mirror 416 is disposed, for example but not limited to, a little upward to reflect the color light G upward. The reflection surface of the reflection mirror 418 is disposed, for example but not limited to, a little downward to reflect the color light G to the second light incident plane 232a. In other words, the position of the reflection mirror 416 is a little lower than the second two-way beam splitter mirror 404 and the combiner 200. However, the position of the reflection mirror 418 is a little higher than the second two-way beam splitter mirror 404 and the combiner 200.

In the path of color light R, the reflection surface of the reflection mirror 420 is disposed, for example but not limited to, a little downward to reflect the color light R upward. The reflection surface of the reflection mirror 422 is disposed, for example but not limited to, a little upward to reflect the color light R to the second light incident plane 222a (not shown). In other words, the position of the reflection mirror 420 is a little higher than the second two-way beam splitter mirror 404 and the combiner 200. The position of the reflection mirror 422 is a little lower than second two-way beam splitter mirror 404 and the combiner 200.

Figure 7:
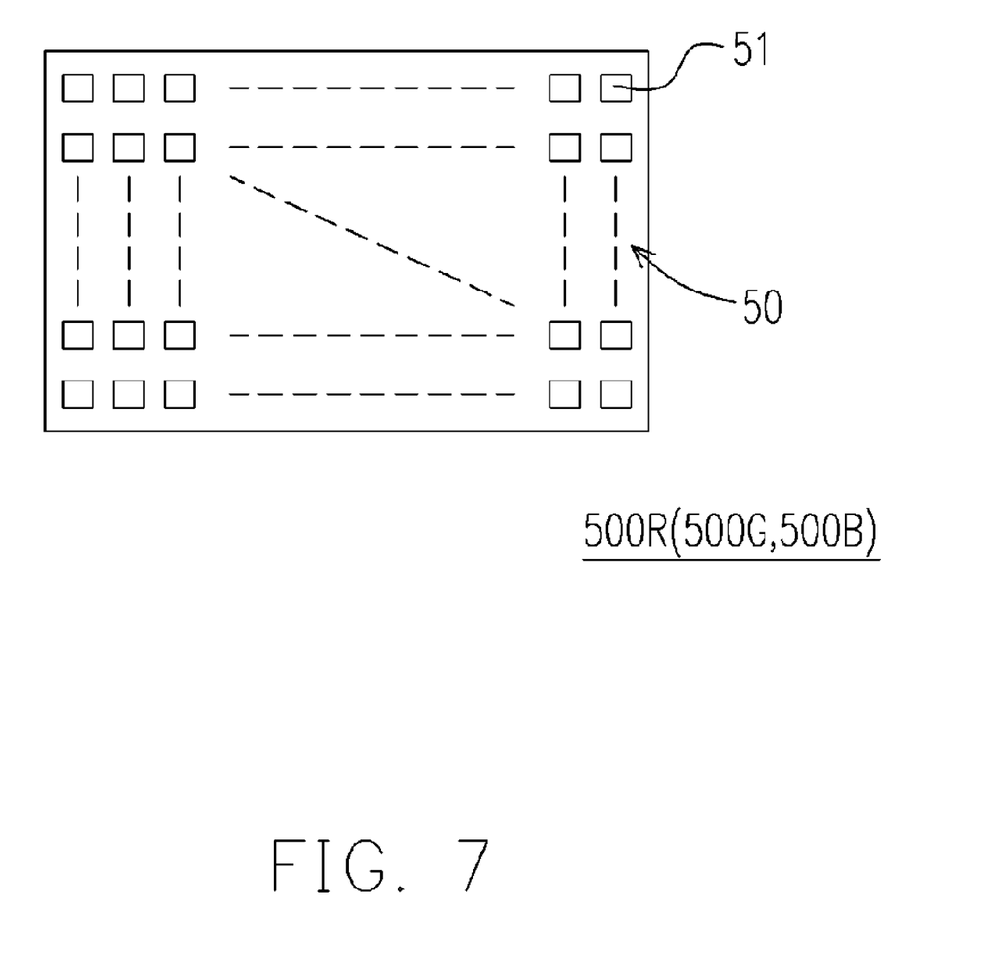
FIG. 7 is a drawing schematically illustrating a digital micro-mirror device (DMD) according to an embodiment of the present invention.
Figure 8A:
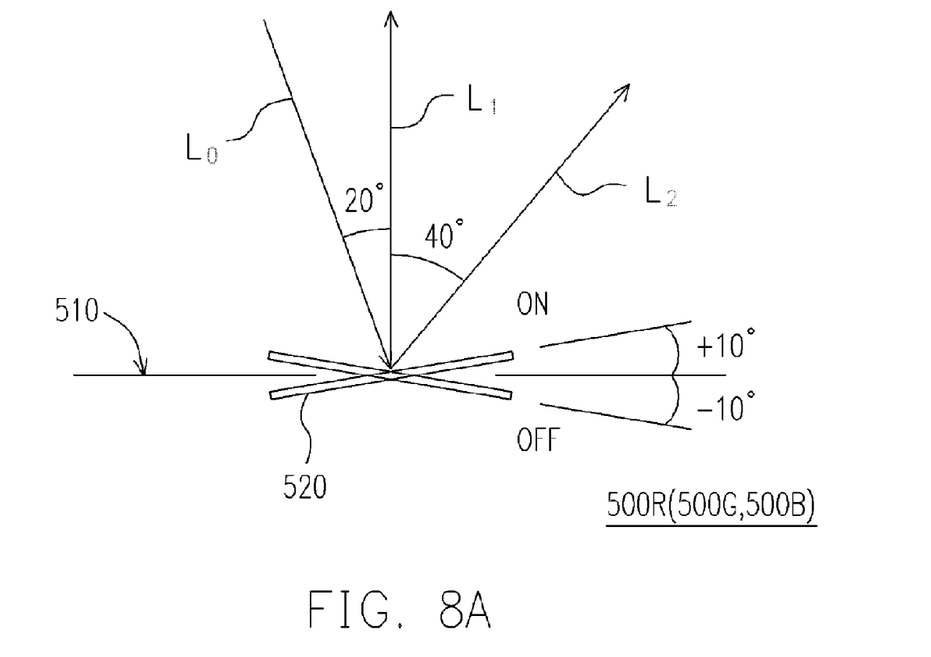
FIG. 8A is a drawing schematically illustrating an embodiment having an angle 10° between micro mirror and active surface according to the present invention.
Figure 8B:
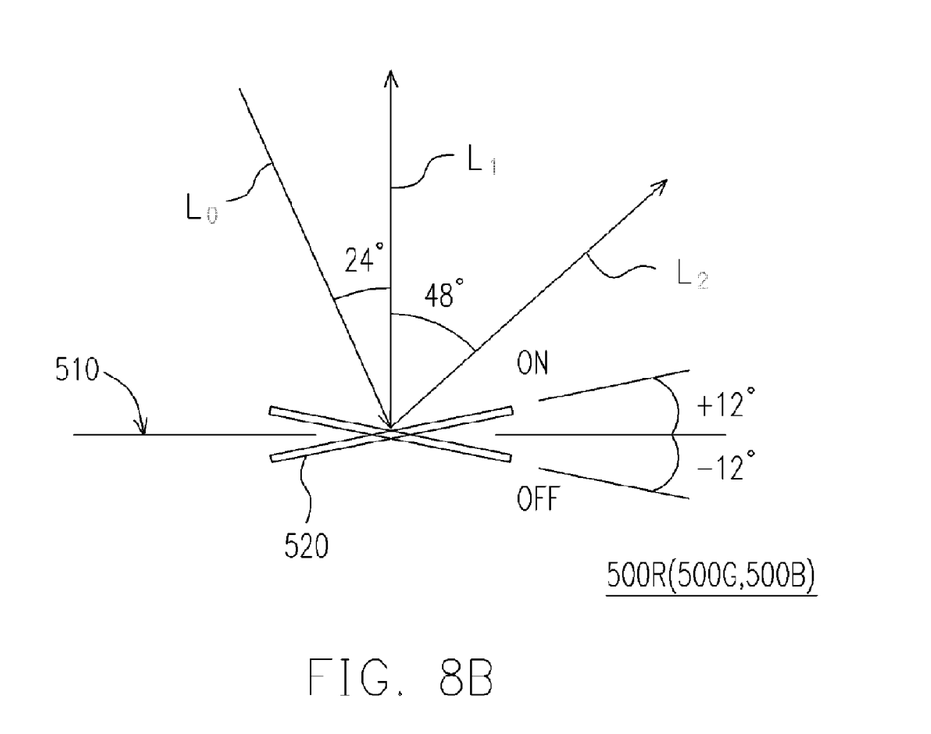
FIG. 8B is a drawing schematically illustrating an embodiment having an angle 12° between micro mirror and active surface according to the present invention.

FIG. 7 is a drawing schematically illustrating a digital micro-mirror device (DMD) according to an embodiment of the present invention. FIG. 8A is a drawing schematically illustrating an embodiment having an angle 10° between micro mirror and active surface according to the present invention. FIG. 8B is a drawing schematically illustrating an embodiment having an angle 12° between micro mirror and active surface according to the present invention. Referring to FIG. 7, FIG. 8A and FIG. 8B, the DMDs 500R, 500G or 500B of FIG. 7 comprise, for example but not limited to, semiconductor components controlled by two-bits pulse tuning. The DMDs 500R, 500G or 500B comprises an active surface 510, and a plurality of array arranged micro mirrors 520 is formed on the active surface 510. The micro mirrors 520 are generally controlled by active components such as metal oxide semiconductor (MOS) disposed on the active surface 510.

In one embodiment of the invention, the tilt angle between the micro mirrors 520 and the active surface 510 is, for example but not limited to, in a range of about +10° to about −10° (as shown in FIG. 8A) or in a range of about +12° to about −12° (as shown in FIG. 8B). Hereinafter, some embodiments will be described corresponding to the tilt angle of the micro mirror 520.

When the tilt angle between the micro mirror 520 and the active surface is about +10° or about +12°, the angle between the incident light L0 and the reflection light L1 is about 20° or 24°. Thus, the reflection light L1 may exit from the transparent region A (as shown in FIG. 5A and FIG. 5B), and the state of the micro mirror 520 is ON.

When the tilt angle between the micro mirror 520 and the active surface is about −10° or −12°, the angle between the incident light L0 and the reflection light L2 is about 40° or 48°. Thus, the reflection light L2 cannot exit the transparent region A (as shown in FIG. 5A and FIG. 5B), and the state of the micro mirror 520 is OFF.

It will be apparent to those skilled in the art that various modifications and variations can be made to the structure of the present invention without departing from the scope or spirit of the invention. In view of the foregoing, it is intended that the present invention cover modifications and variations of this invention provided that they fall within the scope of the following claims and their equivalents.

What is claimed is:

1. An optical combiner module, disposed in an intersection of a plurality of color lights split by a beam splitter module, the optical combiner module comprising:
   a combiner, comprising at least a pared-corner, wherein the combiner is substantially a regular hexahedron, at least one corner of the combiner is cut to form at least one lean surface, the lean surface is connected to a top surface or a bottom surface of the combiner, and an angle between the lean surface and the top surface or the bottom surface is larger than 0°;
   a plurality of prisms, disposed adjacent to the combiner, wherein one side of one of the prisms is leaned adjacent to the pared-corner of the combiner; and
   a plurality of light valves for forming the image, respectively disposed in a path of the color lights after the prisms, wherein the color lights are reflected to the light valves by a total reflection plane of each of the prisms respectively and said color lights reflected by the light valves are transmitted through the prisms and thereafter are combined by the combiner.

2. The optical combiner module of claim 1, wherein the combiner comprising:
   four sides; and
   the at least one lean surface comprising three lean surfaces, wherein the top surface and the bottom surface are adjacent to the sides respectively, a portion of the lean surfaces is adjacent to the top surface and one of the sides, and another portion of die lean surfaces is adjacent to the bottom surface and another one of the sides.

3. The optical combiner module of claim 2, wherein the prisms comprises three total internal reflection (TIR) prisms, and each of the TIR prisms comprising:
   a first prism, comprising a first light incident plane, a first junction surface and a first light exit plane; and
   a second prism, comprising a second junction surface and a second light exit plane, wherein an air gap is disposed between the second junction surface and a portion of the first junction surface, another portion of the first junction surface is disposed adjacent to the one of the lean surfaces, and the second light exit plane is disposed adjacent to another one of the side.

4. The optical combiner module of claim 3, wherein each of the first light incident planes of the TIR prisms is disposed on a first plane, and the top surface of the combiner is disposed on a second plane, and an angle between die first plane and the second plane is about 45°.

5. The optical combiner module of claim 2, wherein a shape of the lean surfaces of the combiner is regular triangle.

6. The optical combiner module of claim 3, wherein the TIR prisms comprise a red light total internal reflection (TIR) prism, a green light TIR prism and a blue light TIR prism, and the red light TIR prism and the blue light TIR prism is disposed on opposite side of the combiner.

7. The optical combiner module of claim 6, further comprising:
   a blue light reflecting coating, disposed in the red light TIR prism; and
   a red light reflecting coating, disposed in the blue light TIR prism.

8. The optical combiner module of claim 3, wherein the second light exit plane of the second prism comprises a transparent region and a light shielding region.

9. A digital light projection system, comprising:
   a light source, for emitting a light;
   a beam splitter module, disposed in a path of the light after the light source, wherein the light is split by the beam splitter module into a plurality of color lights;
   the optical combiner module of claim 1, disposed in an intersection of the color lights of the beam splitter module; and
   a projection lens, disposed in a path of the color lights after the optical combiner module.

10. The digital light projection system of claim 9, wherein the color lights comprise a first color light, a second color light and a third color light.

11. The digital light projection system of claim 10, wherein the beam splitter module comprising:
   a first two-way beam splitter mirror, disposed in a pat of the light after the light source for reflecting the first color light and transmitting the second color light and the third color light; and
   a second two-way beam splitter mirror, disposed in a pat of the second color light and the third color light after the first two-way beam splitter mirror for reflecting the second color light and transmitting the third color light.

12. The digital light projection system of claim 11, further comprising:
   a rod integrator, disposed in a path of the light between the light source and the first two-way beam splitter mirror.

13. The digital light projection system of claim 11, wherein the beam splitter module further comprising:
   at least a first condenser lens, disposed in a path of the light between the light source and die first two-way beam splitter mirror.

14. The digital light projection system of claim 13, wherein the beam splitter module further comprising:
   a plurality of second condenser lenses, disposed in a path of the first color light, the second color light and the third color light between the second two-way beam splitter mirror and a plurality of TIR prisms.

15. The digital light projection system of claim 11, wherein the beam splitter module further comprising:
  at least a reflection mirror, disposed in a path of the light between the first two-way beam splitter mirror and the combiner.

16. The digital light projection system of claim 9, wherein a first light incident planes of the TIR prisms is disposed on a first plane, and the top surface of the combiner is disposed on a second plane, and an angle between the first plane and the second plane is about 45°.

17. The digital light projection system of claim 9, wherein a shape of the lean surfaces of the combiner is regular triangle.

18. The digital light projection system of claim 9, wherein the TIR prisms comprise a red light TIR prism, a green light TIR prism and a blue light TIR prism, and the red light TIR prism and the blue light TIR prism are disposed on opposite side of the combiner.

19. The digital light projection system of claim 18, further comprising:
  a blue light reflecting coating, disposed in the red light TIR prism; and
  a red light reflecting coating, disposed in the blue light TIR prism.

20. The digital light projection system of claim 9, wherein the second light exit plane of the second prism comprises a transparent region and a light shielding region.

* * * * *